(12) United States Patent
de la Asuncion

(10) Patent No.: US 6,676,709 B1
(45) Date of Patent: Jan. 13, 2004

(54) SYSTEM FOR ABSORBING IMPACTS IN MOTOR VEHICLES

(75) Inventor: Ramiro Tarazona de la Asuncion, Zaragossa (ES)

(73) Assignee: Taexpa, S.A., Tarazona (ES)

(*) Notice: Subject to any disclaimer, the term of this patent is extended or adjusted under 35 U.S.C. 154(b) by 141 days.

(21) Appl. No.: 10/049,485

(22) PCT Filed: Jul. 12, 2000

(86) PCT No.: PCT/ES00/00264

§ 371 (c)(1),
(2), (4) Date: Feb. 8, 2002

(87) PCT Pub. No.: WO01/12494

PCT Pub. Date: Feb. 22, 2001

(30) Foreign Application Priority Data

Aug. 11, 1999 (ES) .............................................. 9901853

(51) Int. Cl.[7] .................................................. B62D 7/22
(52) U.S. Cl. ...................... 280/784; 180/232; 180/274; 293/133; 296/187.03
(58) Field of Search ........................ 280/784; 180/232, 180/274; 293/132, 133; 296/187.03, 187.09

(56) References Cited

U.S. PATENT DOCUMENTS

| | | | | |
|---|---|---|---|---|
| 3,822,076 A | * | 7/1974 | Mercier et al. ............. | 293/107 |
| 4,569,534 A | * | 2/1986 | Nalbandyan et al. ....... | 280/749 |
| 4,823,905 A | * | 4/1989 | Piech ......................... | 180/274 |
| 4,836,321 A | | 6/1989 | Baumann .................... | 180/232 |
| 4,869,539 A | * | 9/1989 | Cassese ...................... | 280/781 |
| 5,154,253 A | | 10/1992 | Vollmer ...................... | 180/274 |
| 5,174,409 A | * | 12/1992 | Osawa ........................ | 180/274 |
| 5,518,271 A | * | 5/1996 | Bell ............................ | 280/806 |
| 6,464,275 B2 | * | 10/2002 | Laurent et al. ............ | 296/35.2 |

FOREIGN PATENT DOCUMENTS

| | | | |
|---|---|---|---|
| DE | 4022137 | * | 1/1992 |
| DE | 4326269 | * | 10/1994 |
| DE | 196 24 932 A1 | | 1/1998 |
| EP | 0 566 840 A1 | | 10/1993 |
| EP | 0 598 685 A1 | | 11/1993 |
| WO | WO 98/40262 | | 9/1998 |

* cited by examiner

Primary Examiner—Paul N. Dickson
Assistant Examiner—Toan C To
(74) Attorney, Agent, or Firm—Gifford, Krass, Groh, Sprinkle, Anderson & Citkowski, PC

(57) ABSTRACT

Improved system for absorbing impacts in motor vehicles consisting in coupling solidly to the vehicle body front beams which are intended to receive the impacts and deformable devices which are secured to the rear part of the body structure and which are intended to absorb strains. The front beams and the rear deformable devices are connected and hinged by a cable which is guided by a pulley provided at the front of the car; the pulley is characterized in that its support shaft is designed with a structure which can be progressively deformed longitudinally by the cable tension upon an impact with the aim to determine an appropriate displacement of the pulley towards the rear part of the vehicle, in accordance with its specific function.

1 Claim, 1 Drawing Sheet

SYSTEM FOR ABSORBING IMPACTS IN MOTOR VEHICLES

FIELD OF THE INVENTION

The present invention relates to an impact absorption system for an automobile, more particularly to an impact absorption system that causes a substantial reversal of the impact force's direction of action.

BACKGROUND OF THE INVENTION

This patent refers to devices provided for absorbing, offsetting and sharing a part of the forces generated over different components of the vehicle when a moving automobile suffers a head-on impact whether against a static body or against another vehicle traveling in the opposite direction.

In either case, generally with greater intensity in the latter of the two mentioned because of the force of inertia consequent on the traveling speeds, vehicles undergo considerable crushing and deformations particularly at their fronts, affecting the integrity of their occupants in a very serious manner.

In an attempt to mitigate the fatal consequences of these collisions, automobile makers have been introducing habitats or reinforced areas into their cars that, in a suitable combination with other parts liable to preconceived deformations, enable the undesirable effects of impacts to be partially reduced.

Devices have been designed with the same intention, with the aim of offsetting or sharing out the forces caused by the collision over the whole vehicle's frame, particularly transmitting part of them to the rear end opposite to the collision.

Such devices achieve the almost simultaneous deformation of the front and rear ends of the vehicle's bodywork and thus extend the amount of the time involved in the deceleration caused by the collision and enabling the deformed surfaces of the rear of the bodywork to also absorb a considerable part of the forces caused by the collision.

One such device is illustrated in patent DE 43 26 269 in which an automobile is described, fitted with a front body having a deformable structure followed by a rigid compartment for passengers.

We may also refer to patent DE 40 22 137 in which the vehicle's front deformable element is supplemented with a system for transmitting force towards the rear thereof, where a second force absorbing element has been fitted. This transmitting element works under compression such that when an impact occurs, the deformation causes the passenger compartment to move towards the car's rear.

In my prior patent, Spanish patent P 97000524, and in German patent DE 196 24 932, a second force absorption area is also included in the vehicle's rear, but such forces are transmitted via cables working under traction. Some element is therefore required which will change the direction of the impact force's action, such as a pulley or a lever. Patent DE 196 24 932 describes cables offering a peculiar elasticity whilst Spanish patent P 0700024 addresses totally rigid cables such that the system's performance is optimized and, therefore the greatest magnitude of energy possible is managed to be transmitted to the deformable element of the car's rear.

From Applicant's above mentioned patent and after continuous studies, calculations and experiments, an important conclusion has been reached that in order to offset and share out a part of the forces, generated by a head-on collision, to the vehicle's rear structure, it is necessary to maintain the cable system which reverses the impact force's direction of action, and it proves clearly fundamental to establish that the axle sustaining the cable guiding pulley be installed on an element that is designed to be progressively deformable in such a way that, after the initial impact, and through the effect of the consequent cable tension, deformation of the support sustaining the pulley axle occurs and, therefore, the pulley likewise moves towards the rear of the car.

By interpositioning this deformable support between the front and rear of a vehicle, a large part of the impact energy is prevented from being transmitted onto the vehicle's chassis which causes the acceleration peak generated after the impact to be reduced.

SUMMARY OF THE INVENTION

From the foregoing, the present invention is primarily intended for use with conventional passenger vehicles, particularly automotive vehicles. A preferred embodiment of the impact absorption system comprises at least one front impact receiving member, a rear absorption member, a cable, a pulley, and a deformable pulley support. The receiving member includes a front end and a rear end and is suitably secured to the automobile's frame proximate the front end of the automobile. The rear absorption device has a front and a rear end and is suitably secured to the frame near the rear end of the vehicle inline with the impact receiving member.

A cable is fastened between the rear end of the receiving member and the rear end of the absorption device. The cable is passed through the front end of the receiving member, extends along its radial axis, and is fastened at the rear end of the absorption device. The pulley is interposed inline between the receiving member and the rear absorption device such that it is proximate the rear end of the receiving member. The pulley is wound by the cable such that an appropriate movement of the cable causes the pulley to move about its rotational axis. The pulley is supported on a deformable pulley support that is adapted to translate the rotational axis of the pulley from a first position to a second position in response to, and in the direction of a colliding force directed perpendicular to the front end of the vehicle. In operation, a head-on collision provides a colliding force that causes a tensioning force on the cable about the pulley. The tensioning force in the cable causes the pulley support to collapse in the direction of the colliding force and causes the absorption device to collapse in a direction opposite the direction of a colliding force.

BRIEF DESCRIPTION OF THE DRAWINGS

In order to facilitate understanding of the invention, the attached drawings show an example of the practical execution thereof.

DETAILED DESCRIPTION OF THE DRAWINGS

Figure 1:
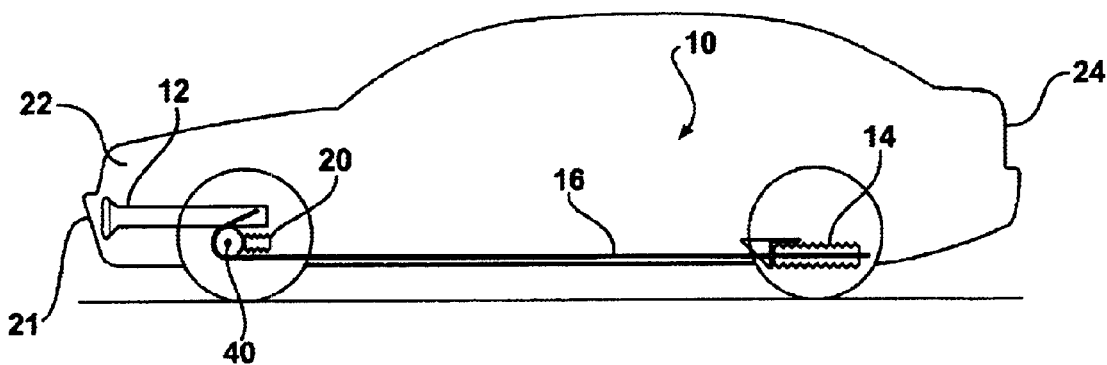
FIG. 1 illustrates a perspective view of an automobile including the impact absorption system as according to the invention.
Figure 2:
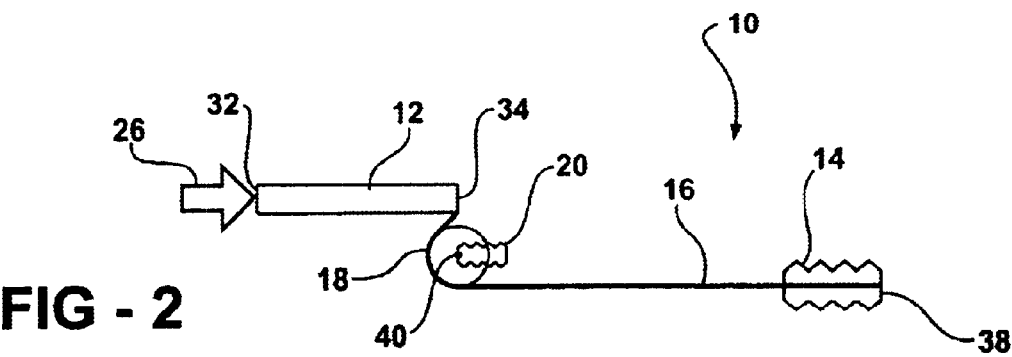
FIG. 2 illustrates the movement immediately prior to an impact occurring with a body exterior to the vehicle, represented by arrow.

As illustrated in FIGS. 1–4, the impact absorption system 10 comprises a front impact receiving member 12 that is secured to the frame near the front end 22 of the automobile that includes a bumper 21. Positioned and secured to the automobile frame proximate the rear end 24 of the vehicle is a rear absorption device 14 designed to deform in response to an appropriate force. A cable 16 is fastened between the rear end 34 of the receiving member 12 and at the rear end 38 of the rear absorption device 14. The cable 16 is fastened at the rear end 38 of the rear absorption device 14 after being passed through its front end 36 and along its radial axis. A pulley 18 is interposed between the rear end 34 of receiving member 12 and the front end 36 of the rear absorption device 14. In the preferred embodiment, the pulley 18 is positioned proximate the rear end 34 of the receiving member 12 in an inline fashion such that the pulley 18 interplays with, or is wound by the cable 16 whereby an appropriate movement of the cable 16 causes the pulley 18 to move about its rotational axis 40. As illustrated in FIG. 2, a deformable pulley support 20 is provided for mounting the pulley 18 of the impact absorbing system 10. Similar to the rear absorption device 14, the support 20 is designed to collapse in response to an appropriate force.

Figure 3:
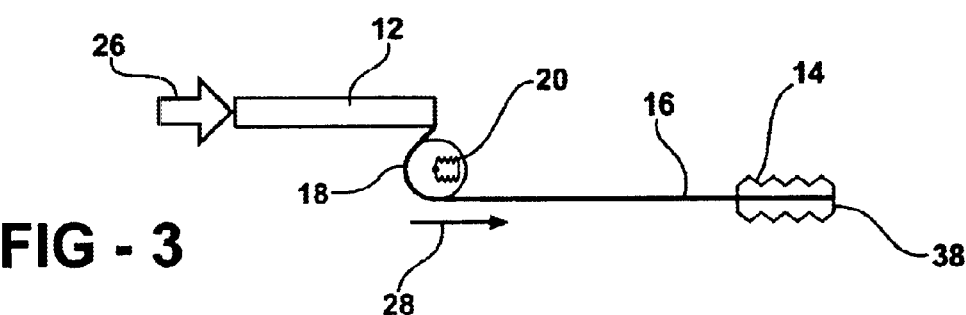
FIG. 3 illustrates initial deformation caused in the system, specifically in the deformable support of the axle of the pulley as a result of the tension caused in the cable by the effects of the colliding force on the vehicle.
Figure 4:
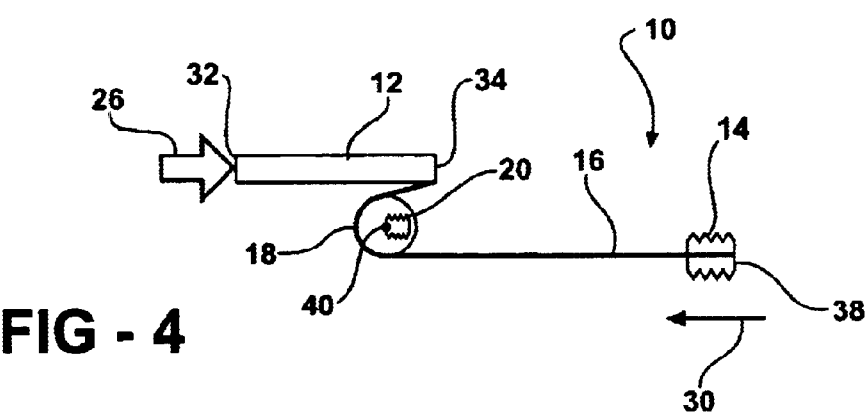
FIG. 4 illustrates the system's final situation, after its operation, in which the deformable support and the rear absorption member have fulfilled their specific mission via their programmed deformation.

The impact absorption system 10 of the present invention is designed to cause the reversal of a portion of an impact force resulting from a head-on collision of a subject automobile in the following manner and as illustrated in FIGS. 2–4. A colliding force 26 causes the receiving member 12 to be moved toward the rear end 24 of the automobile. The rearward movement of the receiving member 12 causes tension in the cable 16 that is wound about the pulley 18 mounted on the deformable pulley support 20. The tensional force in the cable 16 causes the deformable support 20 to collapse in the same direction 28 of the colliding force 26.

As described above, the cable 16 extends through the front end 36 and the radial axis of the rear absorption device 14 and then is fastened at the device's rear end 38. Thus, the tension in the cable 16 causes the absorption device 14 to collapse in a direction opposite 30 the direction 26 of the colliding force.

What is claimed is:

1. A system for impact absorption for an automotive vehicle having a chassis, a front end, a front bumper, and a rear end, said system comprising:

at least one front impact receiving member having a front end and a rear end, said receiving member being secured to the vehicle's chassis at said front end of the vehicle proximate said front bumper;

a rear absorption device having a front and a rear end, said device being secured to the chassis proximate the rear end of the vehicle;

a cable fastened between said receiving member and said rear end of said absorption device;

a pulley having a rotational axis and having said cable arrayed over said pulley, the pulley being interposed between the receiving member and said rear absorption device; and a deformable pulley support having one end connected to the pulley and another end connected to the vehicle chassis, said support adapted to translate said rotational axis of said pulley from a first position to a second position in response to, and in the direction of a colliding force directed perpendicular to the front end of the vehicle, said colliding force forcing the receiving member toward the rear end of the vehicle thereby causing a tensioning force on the cable that collapses said deformable pulley support in the direction of the colliding force and causes the absorption device to collapse in a direction opposite the direction of the colliding force.

* * * * *